BRIDGE CIRCUIT FOR AMPLIFIER GAIN VERSUS TEMPERATURE COMPENSATION

Filed Sept. 29, 1965

INVENTOR
S. F. SAMPSON
BY Lucian C. Canepa
ATTORNEY

United States Patent Office 3,387,206
Patented June 4, 1968

3,387,206

BRIDGE CIRCUIT FOR AMPLIFIER GAIN VERSUS TEMPERATURE COMPENSATION

Sidney F. Sampson, Lincroft, N.J., assignor to Bell Telephone Laboratories, Incorporated, New York, N.Y., a corporation of New York Filed Sept. 29, 1965, Ser. No. 491,225
8 Claims. (Cl. 323—75)

ABSTRACT OF THE DISCLOSURE

A bridge circuit is disclosed including a diode in one of two diagonally opposite branches thereof and the base-emitter junction of a transistor in the other. A variable resistor and current source is connected to a first pair of opposite bridge terminals while a potentiometer is connected to the other diagonally opposite terminals. An output control signal is derived from the tap of the potentiometer. The particular setting for the variable resistor and the potentiometer determines the equiescent signal value of the temperature coefficient of the bridge.

Figure 1:
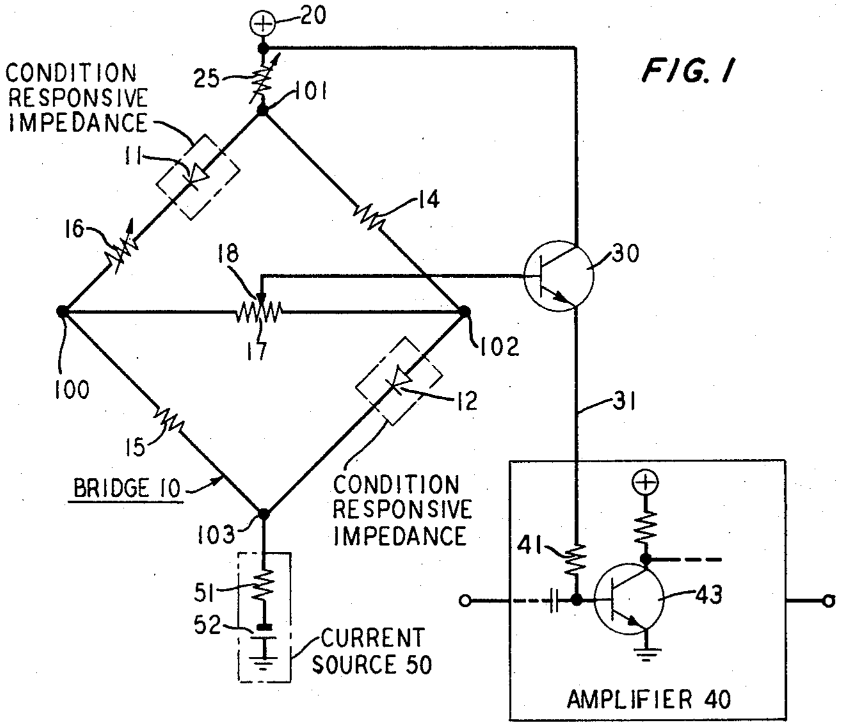

This invention relates to electronic circuit stabilization and, more specifically, to a circuit organization for condition (e.g. temperature) compensating a principal circuit arrangement.

As is well known, many electronic circuits exhibit functional parameters which depend upon the physical environment of the circuit. For example, the gain of semiconductor amplifiers increases with temperature since the current gain of each included transistor is a direct function thereof. By way of further illustration, other environment-dependent circuit characteristics comprise the repetition rate of ring counters, and the output frequency of semiconductor oscillators.

Where precision is important, it has been found desirable to regulate such circuits by providing for an adjustable quiescent parameter level at some nominal encountered condition, e.g. at a first temperature, and to automatically maintain the parameter at its quiescent value irrespective of variations in the monitored condition. However, a relatively simple circuit arrangement for effecting the above-described result has heretofore been unavailable.

It is therefore an object of the present invention to provide a condition compensating circuit arrangement.

More specifically, an object of the present invention is the provision of a condition compensating arrangement which establishes an initial parameter value for a regulated circuit, and which cancels the effect of environmental changes on the regulated circuit.

It is another object of the present invention to provide a condition compensating circuit arrangement which may be relatively simply and inexpensively constructed, and which is highly reliable.

These and other objects of the present invention are realized in a specific illustrative condition compensating arrangement adapted to generate an output control signal which may be employed to stabilize a principal circuit parameter (e.g. amplifier gain) via a voltage responsive parameter regulating element included therein. The control potential is characterized by a variable quiescent value for principal circuit initialization, and an independently variable (sign and magnitude) condition responsive gradient for principal circuit condition compensation.

The arrangement comprises a bridge circuit including condition responsive impedances in two diagonally opposite branches thereof, a variable resistor and a current source connected to a first pair of opposite bridge nodes, and a potentiometer connected to the other diagonally opposite bridge node pair, with the output control signal being derived from the tap of the potentiometer. The particular settings for the variable resistor and the potentiometer respectively determine the quiescent signal value, and the particular condition responsive voltage gradient.

It is thus a feature of the present invention that a condition compensating circuit arrangement comprise circuitry for establishing a quiescent value for a controlled circuit parameter, and independently adjustable circuitry which is responsive to a monitored environmental condition for rendering such parameter insensitive to changes in the monitored condition.

It is another feature of the present invention that a condition compensating arrangement include a bridge circuit comprising a potentiometer connected to a first pair of opposite bridge nodes and two elements characterized by condition responsive impedances included in two diagonally opposite branches thereof, and a variable resistor and a serially-connected current source connected to the other pair of opposite bridge nodes.

Figure 2A:
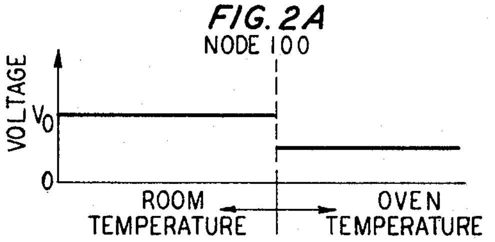
Figure 3:
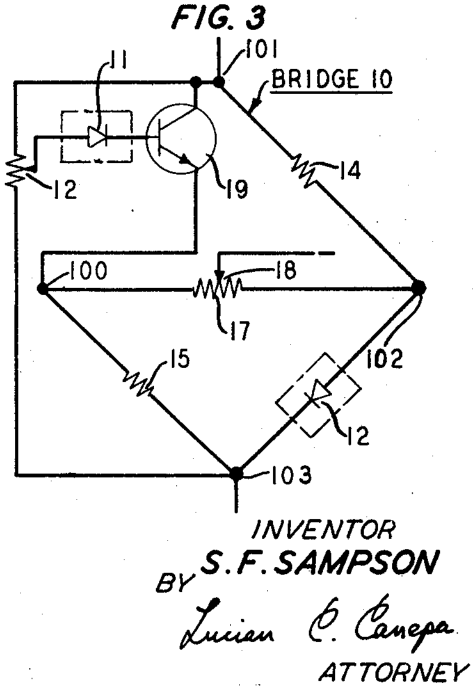

A complete understanding of the present invention and of the above and other features, advantages and variations thereof may be gained from a consideration of the following detailed description of an illustrative embodiment thereof presented hereinbelow in conjunction with the accompanying drawings, in which:

FIG. 1 is a schematic diagram of a specific illustrative condition compensating arrangement which embodies the principles of the present invention;

FIGS. 2A and through 2C comprise state diagrams depicting the voltage levels which characterize selected circuit elements included in the FIG. 1 arrangement; and FIG. 3 is a schematic diagram of a second illustrative embodiment for a bridge 10 shown in FIG. 1.

Referring now to FIG. 1, there is shown a specific illustrative condition compensating arrangement adapted to generate an output control signal which is employed to stabilize the gain of a regulated principal circuit, viz., an amplifier 40. The arrangement includes a bridge circuit configuration 10 which includes four nodes 100 through 103, with two resistors 14 and 15 being respectively connected between the nodes 101 and 102, and 100 and 103. Condition responsive impedance devices are connected between the nodes 100 and 101, and 102 and 103, with an adjustable resistor 16 being serially included in the bridge branch defined by the former node pair for purposes of balancing the bridge 10.

A positive voltage source 20 is connected to the bridge node 101 via a variable resistor 25, and a current source 50, embodying a relatively large resistor 51 and a serially-connected relatively large-valued potential source 52, is connected to the node 103. Also, a potentiometer 17, having an adjustable tap 18 thereon, is connected between the nodes 100 and 102. A transistor 30 is employed in the FIG. 1 arrangement, and has the collector, base and emitter terminals thereof respectively connected to the source 20, the potentiometer tap 18, and a lead 31.

For purposes of concreteness, and without any loss of generality, it will hereinafter be assumed that the FIG. 1 condition compensating arrangement is employed to stabilize the gain of the amplifier 40 with respect to any changes therein attributable to variations in environmental temperature. To this end, a cascade-connected grounded emitter transistor 43 is included in the amplifier 40, with the base terminal thereof connected to the lead 31 via a relatively large resistor 41. As will become clearer from the following, the transistor 43 is biased by the current flowing through the element 41 to the variable current gain (i.e. the variable beta) portion of its amplifying characteristic. Accordingly the signal gain generated by the transistor 43, and thereby also the gain produced by the composite amplifier 40, is a direct function of the current which flows through the resistor 41. This current, in turn, is directly related to the potential impressed on the lead 31 by the emitter of the transistor 30. More specifically, the gain-regulating biasing current is essentially given by the quotient of the voltage on the lead 31 divided by the resistance value characterizing the element 41.

Further in this regard, since temperature is the monitored environmental condition, the condition responsive impedances included in the bridge 10 may advantageously comprise two semiconductor diodes 11 and 12, as shown in FIG. 1. As is well known, semiconductor diodes, in correspondence with semiconductor transistor devices, exhibit a junction characteristic wherein the effective impedance thereof is directly proportional to the ambient temperature.

Considering the operation of the FIG. 1 condition compensating arrangement in overall terms, the bridge 10 is first balanced. The resistor 25 is then adjusted to provide the desired quiescent voltage at the potentiometer tap 18, with approximately the same voltage also being supplied by the emitter follower transistor 30 and lead 31 to the amplifier-controlling resistor 41. In this regard, it is noted that since the bridge 10 is balanced, the same absolute voltage appears at the bridge nodes 100 and 102, and therefore also appears at the potentiometer tap 18 independent of the setting or positioning thereof.

The composite FIG. 1 arrangement is then placed in an oven, or other environment which is higher than room temperature, and which preferably exceeds the maximum condition anticipated for the amplifier 40 in its intended operation. The potentiometer 17 is then adjusted to reset the amplifier 40 gain to its desired quiescent value. Following the above, the circuit may be applied to its intended usage. As considered hereinafter, the amplifier 40 will maintain its quiescent gain for any encountered operational temperature.

With the above general observations in mind, the operation characterizing the FIG. 1 arrangement will now be considered in detail. At some nominal room temperature, the bridge 10 is balanced by adjusting the resistor 16. As is well known, the bridge 10 is balanced when the products of the impedances included in the two diagonally opposite bridge branch pairs are equal.

Figure 2B:
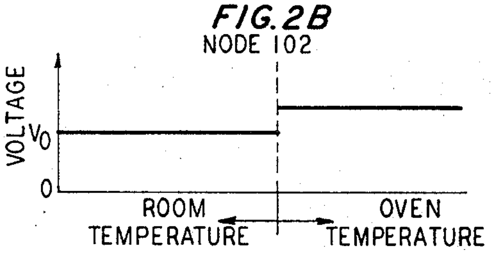

The resistor 25 is then adjusted at room temperature to initialize the gain of the amplifier 40 to its desired value. More specifically, since the bridge is in a balanced condition, the voltages at the bridge nodes 100 and 102 are equal (assumed to be of a value $V_0$ in the left-half portion of FIGS. 2A and 2B), wherein the level $V_0$ is given by the sum of the voltage supplied by the source 20, the voltage drop defined by the product of the current supplied by the current source 50 and the specific impedance value for the variable resistor 25, and the relatively small, like potential drops across each of the upper bridge branches.

Since the absolute voltages at the bridge nodes 100 and 102 are equal and given by $V_0$, there is no voltage drop across the potentiometer 17 (shown in the left portion of FIG. 2C), and hence the voltage $V_0$ appears at the potentiometer tap 18 irregardless of the particular setting thereof. It is observed that the independence between the gain determining initial control voltage and the temperature compensating, condition responsive gradient voltage alluded to above directly follows from the above-cited fact that the voltage $V_0$ is initially applied by the tap 18 to the transistor 30 without regard to the setting of the potentiometer tap 18.

The voltage $V_0$, less a few tenths of a volt due to the base-to-emitter drop across the input junction of the transistor emitter follower 30, is essentially impressed by the lead 31 across the amplifier biasing resistor 41. The resulting biasing current, defined by the quotient of this voltage divided by the resistance value characterizing the element 41, is operative to bias the transistor 43, and thereby also the composite amplifier 40, to the desired gain level at the first encountered, room temperature.

The FIG. 1 arrangement is next exposed to an environment comprising a temperature preferably higher than any expected in the normal usage of the amplifier 40, for example placed in a conventional scientific oven. Under this condition, the gain of the amplifier 40 increases since the beta, or current gain characteristizing each of the semiconductor transistors included therein increases. However, also responsive to this temperature condition, the impedance values exhibited by the bridge semiconductor diodes 11 and 12 increase. Accordingly, the bridge 10 becomes unbalanced, with the bridge nodes 100 and 102 respectively decreasing and increasing in absolute potential from the initial value $V_0$, as shown in the right-half portion of FIGS. 2A and 2B.

Figure 2C:
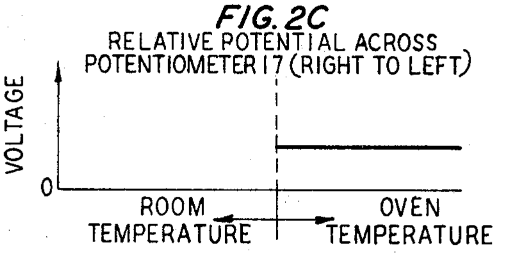

By reason of the foregoing circuit functioning, a net positive potential, shown in the right portion of FIG. 2C, is developed in a right-to-left relative direction across the potentiometer 17. More particularly, assuming the devices 11 and 12 undergo similar impedance changes, the physical center of the potentiometer 17 is characterized at this time by the absolute potential $V_0$, while the voltage respectively increases and decreases from this level to the right and left of center.

Since the amplifier 40 has increased in gain with a corresponding increase in temperature, the voltage across the biasing resistor 41 must be reduced to lower the gain to its desired value. Accordingly, the tap 18 is displaced to the left of center across the potentiometer 17 until the voltage supplied to the gain regulating amplifier element 41 via the transistor 30 and lead 31 is sufficiently less than $V_0$ to accomplish the desired gain reduction. At this point, the composite FIG. 1 arrangement may be removed from the oven, and impressed into its intended application.

The FIG. 1 arrangement, adjusted as above, will temperature compensate the amplifier 40 in the following manner. The bridge was balanced at room temperature, and adjusted to supply the proper initial control voltage to the amplifier 40 to yield the desired gain value. As the encountered temperature increases from the nominal room value, the diodes 11 and 12 progressively unbalance the bridge to the same relative degree that the transistors in the amplifier 40 increase in gain. The setting of the potentiometer tap 18, in turn, translates the temperature responsive voltage developed across the device 17 into a temperature responsive voltage gradient (a volts per degree transfer characteristic) which is proximately impressed on the amplifier 40 biasing resistor 41. Therefore, since the amplifier 40 is gain initialized and since, moreover, the bridge condition responsive impedances 11 and 12 provide the requisite gain gradient throughout the anticipated temperature range, the temperature compensating biasing voltage impressed on the link 31 will in every case maintain a constant gain value for the amplifier 40. Hence, the FIG. 1 arrangement has been shown by the above to supply a control voltage to the amplifier 40 to render the gain of the regulated principal amplifier circuit 40 indepedent of changes in the encountered environmental temperature.

Turning now to FIG. 3, there is shown an alternate embodiment for the bridge 10 which provides a somewhat higher degree of temperature compensation than does the FIG. 1 arrangement. To this end, the bridge branch between the nodes 100 and 101 is modified to include an isolating and gain producing transistor 19, and, in addition, the bridge balancing resistor 16 included in the FIG. 1 arrangement is replaced by a potentiometer 12. Moreover, the condition responsive diode 11 is connected between the tap of the potentiometer 12 and the base of the transistor 19. The FIG. 3 embodiment for the bridge 10 operates in a manner analogous to the FIG. 1 arrangement, except that operational improvement is achieved due to the isolation and gain effected by the transistor 19.

To summarize, a condition compensating arrangement is adapted to generate an output control signal on the lead 31 which may be employed to stabilize a principal circuit parameter (e.g. the gain of the amplifier 40) via a voltage responsive parameter regulating element included therein. The control potential is characterized by a variable quiescent value for principal circuit initialization, and an independently variable (sign and magnitude) condition responsive gradient for principal circuit condition compensation.

The arrangement comprises a bridge circuit including condition responsive impedances in two diagonally opposite branches thereof, a variable resistor and a current source connected to a first pair of opposite bridge nodes, and a potentiometer connected to the other diagonally opposite bridge node pair, with the output control signal being derived from the tap of the potentiometer. The variable resistor and the potentiometer respectively give rise to the quiescent signal value, and to the particular condition responsive voltage gradient.

It is to be understood that the above-described arrangements are only illustrative of the application of the principles of the present invention. Numerous other arrangements may be devised by those skilled in the art without departing from the spirit and scope thereof. For example, if pressure is the monitored environmental condition, the diodes 11 and 12 shown in the FIG. 1 arrangement are advantageously replaced by pressure sensitive resistors, such as the well known membrane-controlled carbon resistance devices.

In addition, only one of the two bridge 10 condition responsive impedances 11 and 12 is required where the FIG. 1 arrangement is required to supply a unipolar condition compensating control signal gradient. For example, in the temperature compensating application considered above, where only a negative gradient was required, either of the diodes 11 or 12 may be replaced by a resistor.

What is claimed is:

1. A condition compensating arrangement comprising a bridge circuit including a tapped potentiometer connected to a first pair of opposite bridge nodes; and two elements characterized by condition responsive impedances included in two diagonally opposite branches thereof, variable potential means connected across a second pair of opposite bridge nodes, and a transistor including a base terminal connected to the tap included on said potentiometer.

2. A combination as in claim 1 further comprising an emitter terminal included on said transistor, and a controlled amplifier including a transistor having a base terminal thereon and a biasing resistor connecting said amplifier transistor base terminal with said transistor emitter terminal.

3. A combination as in claim 2 wherein said condition responsive impedances comprise rectifying diodes.

4. A combination as in claim 3 wherein the other pair of opposite bridge branches comprise resistors.

5. A combination as in claim 1 wherein a variable resistor means is included in one of said diagonally opposite branches in series with one of said condition responsive impedances for balancing said bridge.

6. In combination in a bridge circuit, first and second diagonally opposite bridge branches each comprising resistance means, a third branch comprising a condition responsive impedance, and a fourth branch, diagonally opposite from said third branch, comprising a transistor including a base terminal, a potentiometer including a tap, and a second condition responsive element connecting the tap of said potentiometer to the base of said transistor.

7. A combination as in claim 6 further comprising an additional potentiometer connected to a first pair of opposite bridge nodes.

8. A combination as in claim 7 further comprising variable potential means connected to one of the other bridge nodes.

References Cited

UNITED STATES PATENTS

| | | | |
|---|---|---|---|
| 2,465,683 | 3/1949 | Griesheimer | 323—75 X |
| 2,801,388 | 7/1957 | Ruge | 323—69 X |
| 2,864,053 | 12/1958 | Woodworth | 323—69 |
| 3,179,874 | 4/1965 | Guennou | 322—25 |
| 3,241,042 | 3/1966 | Rosenfeld et al. | 323—22 |
| 3,311,840 | 3/1967 | Gillard | 330—146 X |
| 3,328,677 | 6/1967 | Naegele | 323—68 |
| 3,330,158 | 7/1967 | Simonyan et al. | 323—75 X |

JOHN F. COUCH, *Primary Examiner.*

W. E. RAY, *Examiner.*